United States Patent [19]

Hagedorn

[11] Patent Number: 5,213,908
[45] Date of Patent: May 25, 1993

[54] ALKALI METAL CARBON DIOXIDE ELECTROCHEMICAL SYSTEM FOR ENERGY STORAGE AND/OR CONVERSION OF CARBON DIOXIDE TO OXYGEN

[75] Inventor: Norman H. Hagedorn, Bay Village, Ohio

[73] Assignee: The United States of America as represented by the Administrator of the National Aeronautics and Space Administration, Washington, D.C.

[21] Appl. No.: 766,593

[22] Filed: Sep. 26, 1991

[51] Int. Cl.[5] .............................. H01M 8/14
[52] U.S. Cl. ...................... 429/16; 429/27; 429/29; 429/30; 429/46; 429/103
[58] Field of Search ............. 429/16, 27, 29, 30, 429/46, 103

[56] References Cited

U.S. PATENT DOCUMENTS

| | | |
|---|---|---|
| 3,511,712 | 5/1970 | Giner . |
| 3,932,195 | 1/1976 | Evans et al. . |
| 3,982,959 | 9/1976 | Partridge et al. . |
| 4,041,210 | 8/1977 | Van Dine . |
| 4,041,216 | 8/1977 | Desplanches et al. . |
| 4,317,865 | 3/1982 | Trocciola et al. . |
| 4,329,403 | 5/1982 | Baker ........................... 429/16 |
| 4,491,624 | 1/1985 | Sarbacher et al. . |
| 4,581,302 | 4/1986 | Vine et al. . |
| 4,591,538 | 5/1986 | Kunz . |
| 4,704,340 | 11/1987 | Kunz .............................. 429/29 |

*Primary Examiner*—Robert Kunemund
*Assistant Examiner*—M. Nuzzolillo
*Attorney, Agent, or Firm*—James A. Mackin; Gene E. Shook; Guy M. Miller

[57] ABSTRACT

An alkali metal, such as lithium, is the anodic reactant, carbon dioxide or a mixture of carbon dioxide and carbon monoxide is the cathodic reactant, and carbonate of the alkali metal is the electrolyte in an electrochemical cell for the storage and delivery of electrical energy. Additionally, alkali metal-carbon dioxide battery systems include a plurality of such electrochemical cells. Gold is a preferred catalyst for reducing the carbon dioxide at the cathode.

24 Claims, 1 Drawing Sheet

ALKALI METAL CARBON DIOXIDE ELECTROCHEMICAL SYSTEM FOR ENERGY STORAGE AND/OR CONVERSION OF CARBON DIOXIDE TO OXYGEN

ORIGIN OF THE INVENTION

The invention described herein was made by employees of the U.S. government and may be manufactured and used by or for the U.S. government without the payment of any royalties thereon or therefor.

BACKGROUND OF THE INVENTION

1. Field of the Invention

The invention relates to electrochemical cells and more particularly to fuel cells which use alkali metal as the anodic reactant.

2. Description of Prior Art

Generally, batteries or electrochemical cells are sealed devices which contain fixed amounts of cathodic and anodic reactants, which are usually quite heavy. If the battery is a "primary" device it must be replaced after one use. For remote, especially extraterrestrial, sites, the difficulty and expense of resupply can be burdensome.

Electrochemical cells which use an alkali metal as anodic reactant have been described. U.S. Pat. Nos. 3,932,195 to Evans et al., 3,982,9589 to Partridge et al. and 4,041,216 to Desplanches et al. teach batteries wherein the alkali metal, sodium, is the anodic reactant and sulfur is the cathodic reactant.

The use of other alkali earth metals as the anodic reactant in fuel cells is also known. Fuel cells are electrochemical cells wherein one or both of the chemicals supplying the electrodes are stored separately and provided to electrodes on demand. Such fuel cells are particularly useful in environments where the replacement of electrochemical cells which have used up their reactant chemicals is especially inconvenient. See, for example U.S. Pat. No. 4,491,629 to Sarbacher et al. The '629 patent teaches a battery wherein aluminum is the anodic reactant. It is suggested that lithium would also be a suitable anodic reactant due to its high energy. This battery uses oxygen as the cathodic reactant and its use is therefore restricted to locations where oxygen is in large supply, limiting its use to terrestrial locations.

Since the electrolytes used in many types of fuel cells are materials which are easily reactive with carbon dioxide, the entrance of carbon dioxide into these cells is therefore undesirable. The carbon dioxide reacts with the electrolyte and forms a precipitate which accumulates at the surface of the porous electrodes of the cell, reducing the efficiency and performance of the cell. U.S. Pat. No. 3,511,712 to Giner teaches a process wherein undesirable carbon dioxide is removed from gas streams of oxygen and hydrogen which are supplied to the cathode or anode of a fuel cell.

U.S. Pat. No. 4,041,210 to Van Dine teaches a power plant which uses fuel cells wherein hydrogen is provided to the anode, oxygen along with carbon dioxide is provided to the cathode, and an alkali metal carbonate is the electrolyte. U.S. Pat. No. 4,317,865 to Trocciola et al. and U.S. Pat. No. 4,581,302 to Vine et al. teach an electrolyte matrix for a fuel cell which uses carbonates which are molten at operating such as alkali metal carbonates, as the electrolyte. U.S. Pat. No. 4,591,538 to Kunz teaches the use of lithium carbonate and potassium carbonate as the electrolyte in a fuel cell.

Fuel cells having alkali metal carbonates as electrolytes are thus known. These fuel cells, however, require the use of oxygen as the cathodic reactant. Although carbon dioxide is provided to the cathode along with the oxygen, it is the oxygen which is reduced at the electrode. Carbon dioxide acts as a depolarizer, reacting with the reduced oxygen to remove it from the electrode.

Therefore, while several of the above patents are directed to fuel cells wherein carbon dioxide is used in addition to oxygen at the cathode, there remains a need for electrochemical cells which use carbon dioxide exclusively at the cathode for use in environments where carbon dioxide is abundant and oxygen is absent.

SUMMARY OF THE INVENTION

According to the present invention an electrochemical fuel cell for the storage and delivery of electrical energy comprises an anode comprising an alkali metal as anodic reactant, a cathode comprising carbon dioxide or a mixture of carbon dioxide and carbon monoxide as the cathodic reactant, and an electrolyte comprising the carbonate of the alkali metal. Because of the reducing power of the alkali metal anodic reactant, a solid barrier capable of conducting the alkali metal ions must separate the alkali metal from the alkali metal carbonate, to prevent a direct chemical reaction. This barrier serves a purpose analogous to that of sodium beta-alumina in the sodium-sulfur battery. The alkali metal carbonate is in physical contact with the alkali metal ion conducting solid barrier and the cathode. Additionally, the present invention pertains to an alkali metal carbon dioxide battery system comprising a plurality of electrochemical cells, the cells being comprised of anodes comprising an alkali metal as anodic reactant, cathodes comprising carbon dioxide or a mixture of carbon monoxide and carbon dioxide as cathodic reactant and an electrolyte of the carbonate of the alkali metal separated from the alkali metal anodic reactant by a barrier capable of conducting the ions of the alkali metal. An especially preferred embodiment uses a gold catalyst at the cathode to promote the reduction of carbon dioxide.

The fuel cell of the present invention therefore performs a novel method of producing electrochemical energy using anodic reactants which are extremely energetic and light, and a cathodic reactant, which since it can be extracted from its environment, exacts no transportation penalty. Such electrochemical cells are particularly useful in environments where carbon dioxide is plentiful, as for example, an industrial site where carbon dioxide is a by-product or an extraterrestrial site such as Mars or Venus.

DETAILED DESCRIPTION OF PREFERRED EMBODIMENTS

Figure 1:
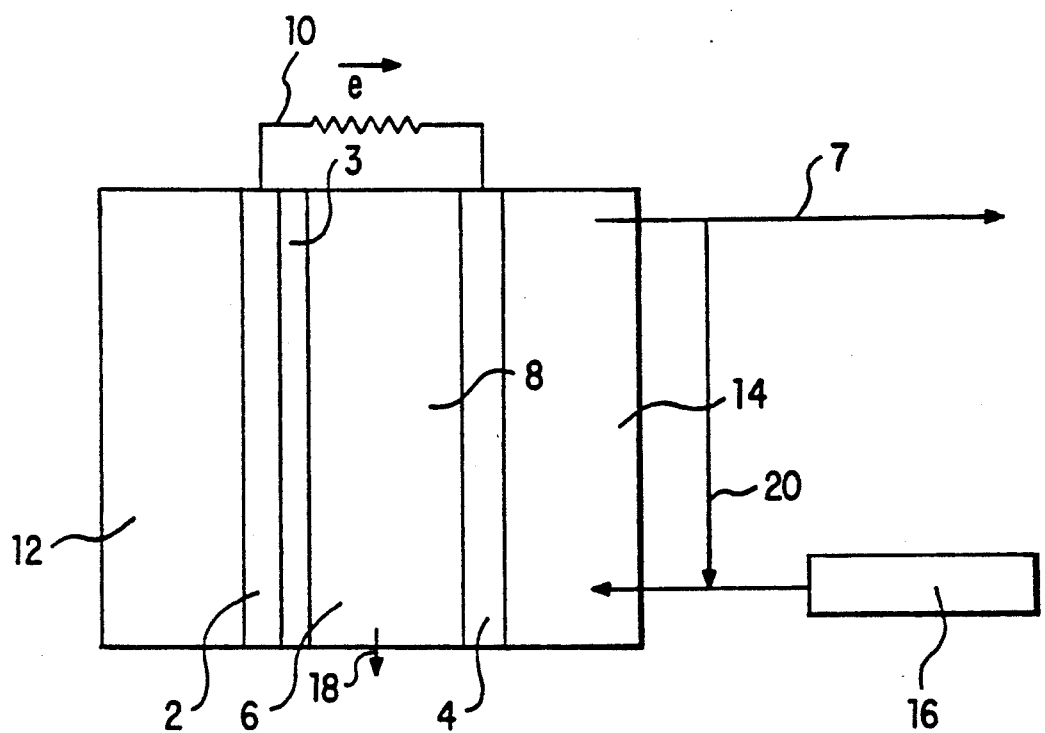
FIG. 1 shows an electrochemical cell of the present invention.

Referring to FIG. 1, an electrochemical cell for the storage and delivery of electrical energy comprises anode 2, alkali metal ion conducting solid 3, cathode 4, and electrolyte chamber 6 wherein the electrolyte is in physical contact with alkali metal ion conducting solid 3 and cathode 4. An alkali metal is delivered to and stored in anode cavity 12 to undergo reaction at anode 2. Carbon dioxide is preferably extracted from the environment and delivered into cathode cavity 14 for reaction at cathode 4. In environments where the supply of carbon dioxide is not suitable for direct use in the cell and must be processed prior to entering cathode cavity 14, the carbon dioxide passes through carbon dioxide conditioner 16.

The carbon dioxide is preferably mixed with carbon monoxide for delivery to cathode 4. Said carbon monoxide, being a product of the cathodic reaction, can be obtained by recirculating a portion of the effluent stream 7 from the cathode cavity 14 to the incoming carbon dioxide stream via bypass 20.

Alkali metals suitable for use in the present invention for reaction at the anode include lithium, sodium, and potassium, with lithium being preferred. Lithium is especially useful because of its high energy density (6300 wh/kg), second only to hydrogen, and it therefore easily lends itself to being transported to remote locations for replenishing the cell.

At operating temperature, both the alkali metal anodic reactant and the electrolyte will be liquid (molten). Anode 2 therefore can be, alternatively, a metallic wire screen which is submerged in free liquid anodic reactant or a porous metallic structure which constrains the liquid anodic reactant by capillary forces. The electrolyte can exist as a free liquid within electrolyte chamber 6 or can be constrained within a porous ceramic structure by capillary forces.

Suitable metals from which to compose the anode are those which are good electronic current conductors and are stable chemically in the presence of alkali metals. Examples of such metals include, but are not limited to, niobium, ferritic stainless steels, iron, molybdenum and tantalum. Ferritic stainless steels are preferred.

The cathode 4 is an electron collector and conductor and preferably incorporates a catalyst to promote the reduction of carbon dioxide. There is a three phase interface between the carbon dioxide cathodic reactant, the catalyst and the electrolyte. The cathode 4 can be a porous metal or wire screen conductor which is catalyzed and in contact with the molten electrolyte. Alternatively, cathode 4 can be a porous ceramic material with a surface coating of catalyst particles in contact with a wire screen current collector. Suitable materials for use as a catalyst at cathode 4 of the present invention include, but are not limited to certain metal oxides, as for example, perovskite-like and pyrochlore-like structures, gold and platinum, with gold being preferred. When gold is used as the catalyst to promote the reduction of carbon dioxide at the cathode, it is preferable that it be finely divided and dispersed on an appropriate current collector and conductor.

The various options and configurations for the anode, cathode and electrolyte are chosen dependent on the geometric orientation of the particular electrochemical cell. For example, in cells which use lithium as the anodic reactant and hence lithium carbonate as the electrolyte, the lithium and the lithium carbonate are liquids at operating temperature while the carbon dioxide is a gas; therefore constraints are placed on the physical structure and orientation of the respective components to avoid bubbling and flooding or draining of components. Additionally, there exists the need to prevent direct contact between the molten lithium and the lithium carbonate or they will react chemically before the cell is able to generate electrochemical energy. Moreover, the anode and cathode must be positioned so that they provide a stable interface between the reactant phases (the lithium and the carbon dioxide), the electrolyte phase (lithium carbonate) and the electron-conducting phase.

Since lithium carbonate is, in addition to being the electrolyte, also the cell reaction product, it is therefore necessary to remove or store internally excess lithium carbonate from electrolyte chamber 6. The present invention further includes means 18 for removing excess lithium carbonate from electrolyte chamber 6, such as an overflow control or wicking device which functions in a manner which prevents intercell shorting.

In operation, as the electrochemical cell as represented in FIG. 1, having lithium as the anodic reactant, is heated to its operating temperature of 800° C.–900° C. (the melting point of lithium is 180° C.), the lithium carbonate electrolyte becomes molten at 729° C. and disassociates to positively charged lithium ions and negatively charged carbonate ions.

$$Li_2CO_3 \rightarrow 2Li^+ + CO_3^=$$

At anode 2, molten lithium is oxidized producing lithium ions and electrons. The electrons are given up to external circuit 10.

$$2Li \rightarrow 2Li^+ + 2e$$

The carbon dioxide which is introduced into cathode 4 is reduced by the electrons given up to the external circuit by lithium, to form carbon monoxide and a carbonate ion. The overall reaction is $$2CO_2 + 2e^- \rightarrow CO + CO_3^=$$

The reduction of carbon dioxide is preferably catalyzed at cathode 4 by a catalyst such as a metal oxide, gold or platinum. Gold is preferred as the catalyst.

The overall cell reaction product, lithium carbonate, is eventually removed from electrolyte chamber 6 by overflow means 18.

In a preferred embodiment, a mixture of carbon dioxide and carbon monoxide is supplied to cathode 4. Since carbon monoxide is a product of the cathodic reaction and is thus continuously ejected into the reactant gas stream, a portion of the effluent stream 7 could be recycled via bypass 20 to build up the carbon monoxide concentration to the desired level.

It is hypothesized that at the cathode the carbonate ion dissociates to carbon dioxide and an oxygen ion, a reaction which is promoted by the initial electrochemical consumption of $CO_2$ present at the electrode.

$$CO_3^= \rightarrow CO_2 + O^=$$

The buildup of the oxide ion at the electrode surface can strongly impede cathode performance. Hence, it is hypothesized that the presence of carbon monoxide at the cathode serves to depolarize the cathode of oxide ions.

$$CO + O^= \rightarrow CO_2^=$$

The $CO_2^=$ ion is quite soluble in the molten carbonate, with solubility comparable to that of $CO_2$, and about 3 times greater than that of CO. $CO_2^=$ is also produced in the cathodic charge transfer sequence.

$$CO_2 + 2e^- \rightarrow CO_2^=$$

The reaction is hypothesized to be finally completed a short distance from the electrode by the reaction of the $CO_2^=$ ion with carbon dioxide, producing the expected products of the overall reaction, carbon monoxide and carbonate ion, thus regenerating carbon monoxide for a continuation of the depolarization process at the cathode.

$$CO_2^= + CO_2 \rightarrow CO + CO_3^=$$

This proposed reaction sequence illustrates the carbon monoxide molecule transporting $O^=$ ions from the cathode surface into the bulk melt via $CO_2^=$ ions, and there being regenerated for return to the cathode.

The present invention includes a battery system which comprises a plurality of electrochemical cells in accordance with the foregoing description. The cells can be arranged in a bipolar series connection by the insertion of an electron conductor such as a stainless steel diaphragm between the anode cavity 12 of one cell and the cathode cavity 14 of an adjacent cell. Alternatively, the cells can be connected in series by edge connection between electrodes of adjacent cells. A conducting strap connects the anode 2 of one cell to the cathode 4 of the adjacent cell. This connection is less favorable than the bipolar connection because it introduces increased resistance losses.

The battery system can further comprise a means 16 for conditioning and delivering the cathodic reactant to cathode 4 (FIG. 1). This would be necessary, for example, in the Martian environment where the atmospheric carbon dioxide pressure is very low. The system would serve to compress the carbon dioxide to a pressure which would be usable in the battery system. In other environments where the atmosphere includes constituents which would interfere with cell performance, e.g., those which would react with vital cell components, the system's conditioning would remove the harmful constituents.

Figure 2:
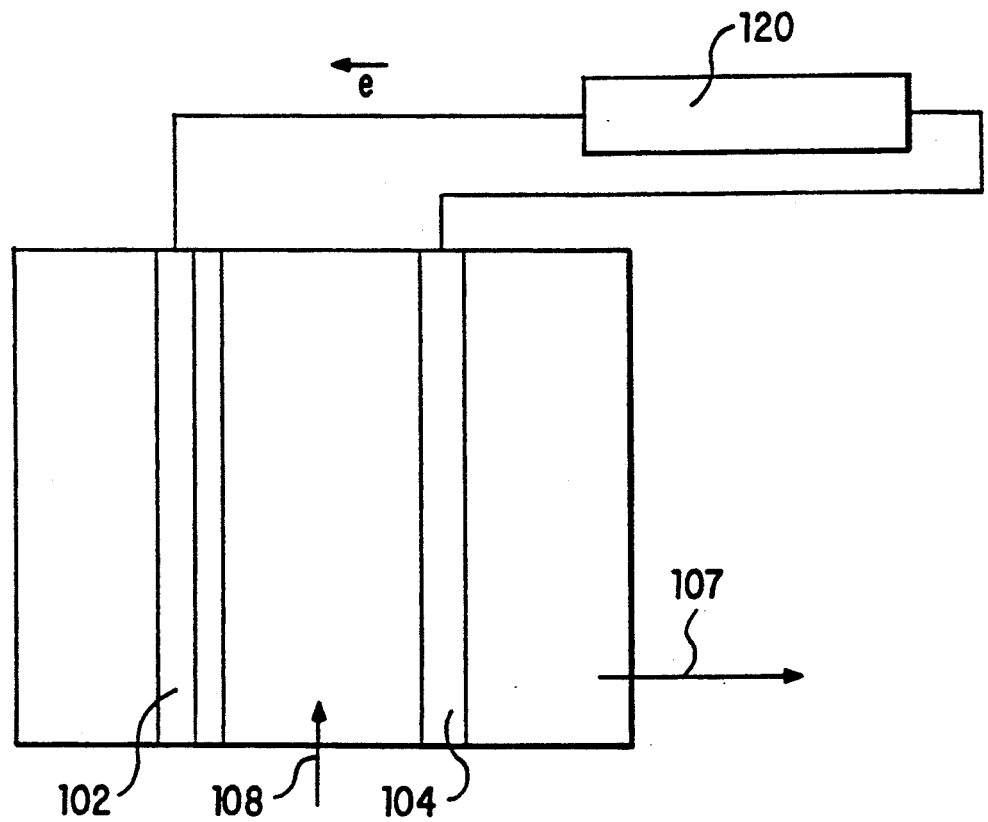
FIG. 2 shows an alternative mode for recharging a cell of the present invention by using an external power source.

The electrochemical cell of the present invention represented by FIG. 1 can be "recharged" by the physical replenishment of the alkali metal, lithium, which has been consumed, into anode cavity 12. In an alternative mode of recharging the cell, as shown in FIG. 2, the battery cell would be recharged by electrolyzing the stored excess electrolyte 108 by the application of external electrical energy from, for example, a central station 120 powered by a nuclear reactor or solar photovoltaic arrays. The reaction at lithium electrode 102 when the battery is recharged in this manner, is the reduction of lithium ions to lithium metal:

$$2Li^+ + 2e^- \rightarrow 2Li$$

At carbon dioxide electrode 104, the application of an external electrical charge would result in the oxidation of carbonate ions to form oxygen atoms and carbon dioxide molecules.

$$CO_3^= \rightarrow CO_2 + \tfrac{1}{2}O_2 + 2e^-$$

Although this latter embodiment is not electrochemically efficient (1.7 volts to discharge as compared to 2.7 volts to charge) this embodiment may be especially useful in environments where an oxygen process stream 107 is at a premium.

EXAMPLE

Apparatus

A 5-cm-diameter gold-plated nickel cup, serving as a counter electrode, was supported by a nickel disk suspended by nickel tie rods from a water-cooled cell cover. The cup was insulated electrically from the supporting nickel disk by an intervening alumina disk. Alumina baffles were spaced above the cup to minimize thermal gradients due to radiation and convection. The water-cooled cell cover made possible the use of O-ring compression fittings, enabling the vertical positioning of cell components such as the working and reference electrodes, reactant gas feed tubes and the cell thermocouple. The cell was enclosed in an alumina sheath and suspended in an "Inconel 600" container which was, in turn, positioned vertically in a tubular furnace. The portion of the "Inconel" container that extended above the furnace was also water-cooled, ensuring the integrity of rubber O-ring flange seals between the cell cover and the container, and those in the fittings in the cell cover.

The working electrode was 99.985 wt % gold foil (Johnson Matthey, Inc.), 1 cm by 1 cm by 0.5 mm. The melt depth was 2.5 cm and the working electrode was vertically centered in the melt and horizontally centered in the counter electrode cup. The reference electrode consisted of an outer 6.35-mm-diameter tube and an inner 3.18-mm-diameter tube, both of 99.8 wt % alumina (Coors); 0.813-mm-diameter, 99.9 wt. % gold wire (Johnson Matthey); and assorted plastic fittings for sealing the electrode and connecting it to the gas supply system. The reference gas entered the electrode via the annulus between the gold wire and the inner tube, and exited between the inner and outer tubes. The outer tube rested flush on the bottom of the counter electrode cup, trapping melt yet providing a thin-film high-impedance path for continuity between the trapped melt and the bulk melt of the cell. The inner tube extended about halfway down from the cell cover, and the gold wire continued to about 1 mm from the bottom of the counter electrode cup. Gold wire leads to the external circuit from the working and counter electrodes were enclosed in 3.18-mm-diameter alumina tubes and were externally sealed at the tube ends with epoxy resin. Prior to cell assembly, all gold electrode surfaces were washed in acetone, isopropyl alcohol, and deionized water.

A chromol-alumel (type K, ±6° C., accuracy) thermocouple was sheathed in a 3.18-mm-diameter "Inconel 600" tube with the lower 7.5 cm gold-plated. The reactant gas feed was a 3.18-mm-diameter, 99.8% alumina tube that could be positioned to bubble the gas through the melt. Two reactant gases were used: 99.9 mol % $CO_2$ and an equimolar mixture (±1 percent mixing accuracy) of 99.99 mol % $CO_2$ and 99.3 mol % CO. The gases were dried in a molecular sieve column (type 4A, Union Carbide) and purified over copper turnings in an in-line tube furnace. Flows were set by hand and monitored with rotameters (Cole-Parmer, ±2 percent accuracy). The $Li_2CO_3$ electrolyte (Fischer Certified ACS grade) was used as purchased.

Power to the cell furnace was regulated by a zero-firing solid-state relay actuated by a digital, solid-state microprocessor (Therm-Pro, Inc.). Stability was ±2°

C. A model 273 potentiostate (EG&G Princeton Applied Research Corp.) was used for the electrochemical experiments.

Procedure

The composition of the reference gas was identical to that of the reactant gas stream.

Linear sweep voltammetry was used to evaluate the performance of the working electrode in response to changes in pressure, temperature, and reactant gas composition, and to the presence or absence of bubbling through the melt. Generally, cathodic sweeps were made at 20, 40, and 80 mV/sec to a polarization of $-100$ mV from the rest potential. The test parameters were total pressures of $1.2 \times 10^5$ and $2.1 \times 10^5$ N/m$^2$; melt temperatures of 800°, 850°, and 900° C.; reactant feeds of $CO_2$ and an equimolar $CO_2$-$CO$ mixture; and a bubble rate, when used, of about 30 ml/min. Because of the cell configuration and the high conductance of the molten $Li_2CO_3$, about 5 $(\Omega\text{-cm})^{-1}$ at 850° C., IR-corrections have not been applied to the measured currents.

When switching from one reactant gas to the other, a laboratory vacuum pump (Leybold, Inc., Model D1.6B) was used to exhaust the existing gas from the cell, and the cell was then repressurized with the replacement gas. The melt was cooled below its solidification temperature of 723° C. to prevent bulk disassociation. When switching from pure $CO_2$ to the mixture, it was sufficient to carry out only one or two vacuum/repressurization cycles. When switching from the gas mixture to pure $CO_2$ in order to quite completely remove the CO component from the cell, four cycles were executed, theoretically reducing the gas phase CO concentration to the order of 10 N/m$^2$.

The partial pressure of $CO_2$ in the gas above the melt was maintained at values greater than the equilibrium dissociation pressure at the existing temperature.

What is claimed is:

1. An electrochemical cell for the storage and delivery of electrical energy, comprising:
   an anode comprising an alkali metal as anodic reactant,
   a cathode comprising carbon dioxide or a mixture of carbon dioxide and carbon monoxide as cathodic reactant,
   an alkali metal ion conducting solid, and
   an electrolyte comprising the carbonate of said alkali metal,
   said electrolyte being in physical contact with said cathode and said alkali metal ion conducting solid, and said alkali metal ion conducting solid separating said alkali metal reactant from alkali metal carbonate electrolyte.

2. The electrochemical cell according to claim 1, wherein said alkali metal is lithium, sodium or potassium.

3. The electrochemical cell according to claim 2, wherein said alkali metal is lithium.

4. The electrochemical cell according to claim 1, wherein the anode is a wire screen or a porous, electronically conductive capillary containment structure.

5. The electrochemical cell according to claim 4, wherein the anode is composed of a member selected from the group consisting of niobium, ferritic stainless steel, iron, molybdenum and tantalum.

6. The electrochemical cell according to claim 5, wherein the anode is composed of ferritic stainless steel.

7. The electrochemical cell according to claim 1, wherein said cathode is in contact with a catalyst and is selected from the group consisting of a porous metal, a metal wire screen and a porous ceramic in contact with a metal wire screen.

8. The electrochemical cell according to claim 7, wherein said catalyst is selected from the group consisting of metal oxides, gold and platinum.

9. The electrochemical cell according to claim 8, wherein said metal oxide is a perovskite-like or a pyrochlore-like structure.

10. The electrochemical cell according to claim 8, wherein said catalyst is gold.

11. The electrochemical cell according to claim 1, wherein said electrolyte is a free liquid at operating temperatures or is constrained within a porous ceramic structure by capillary forces.

12. The electrochemical cell according to claim 1, wherein said anode reactant is a free liquid at operating temperatures or is constrained within a porous ceramic structure or a porous metallic structure by capillary forces.

13. The electrochemical cell according to claim 1, wherein the cathodic reactant is a mixture of carbon monoxide and carbon dioxide.

14. The electrochemical cell according to claim 1, which further comprises means for removing or storing excess carbonate of alkali metal.

15. An alkali metal carbon dioxide battery system comprising a plurality of electrochemical cells which comprise an anode comprising an alkali metal as anodic reactant, a cathode comprising carbon dioxide or a mixture of carbon dioxide and carbon monoxide as cathodic reactant, an alkali metal ion conducting solid, and an electrolyte comprising the carbonate of the alkali metal, said electrolyte being in physical contact with the alkali metal ion conducting solid and the cathode, and said alkali metal ion conducting solid separating the alkali metal from the electrolyte.

16. The battery system according to claim 15, wherein the electrochemical cells are connected in bipolar series.

17. The battery system according to claim 15, which further comprises a means for conditioning and delivering said carbon dioxide to each said cathode.

18. A process for producing electrochemical energy, comprising:
   simultaneously contacting: (1) an alkali metal with an anode, (2) an alkali metal ion conducting solid with the anode, (3) carbon dioxide or a mixture of carbon dioxide and carbon monoxide with a cathode, and (4) carbonate of the alkali metal with the alkali metal ion conducting solid and the cathode;
   thereby reducing carbon dioxide at the cathode and releasing electrons at the anode.

19. The process according to claim 18, wherein said alkali metal is selected from the group consisting of lithium, sodium and potassium.

20. The process according to claim 19, wherein said alkali metal is lithium.

21. The process according to 18, wherein the cathode is in contact with a catalyst.

22. The process according to claim 21, wherein said catalyst is selected from the group consisting of metal oxides, gold and platinum.

23. The process according to claim 22, wherein said catalyst is gold.

24. The process according to claim 18, wherein a mixture of carbon dioxide and carbon monoxide is contacted with the cathode.

* * * * *